United States Patent [19]

Bott et al.

[11] 4,339,145

[45] Jul. 13, 1982

[54] VEHICLE WIND DEFLECTOR

[75] Inventors: John A. Bott, 931 Lakeshore Dr., Grosse Pointe Shores, Mich. 48236; John S. Cucheran, Lake Orion, Mich.

[73] Assignee: John A. Bott, Grosse Pointe Shores, Mich.

[21] Appl. No.: 206,307

[22] Filed: Nov. 12, 1980

[51] Int. Cl.³ .............................................. B62D 35/00
[52] U.S. Cl. ................................... 296/1 S; 224/316; 296/91
[58] Field of Search ................... 296/1 S, 91; 224/316, 224/326

[56] References Cited

U.S. PATENT DOCUMENTS

| | | | |
|---|---|---|---|
| D. 204,932 | 5/1966 | Bott | D14/6 |
| 3,596,975 | 8/1971 | Stephen | 296/1 S |
| 3,799,603 | 3/1974 | Bott | 296/1 S |
| 3,856,193 | 12/1974 | Bott | 224/42.1 D |
| 4,155,585 | 5/1979 | Bott | 296/1 S |
| 4,241,860 | 12/1980 | Ingram | 224/316 |
| 4,293,159 | 10/1981 | Bott | 296/91 |

*Primary Examiner*—Richard A. Bertsch
*Assistant Examiner*—John A. Carroll
*Attorney, Agent, or Firm*—Harness, Dickey & Pierce

[57] ABSTRACT

An automobile wind deflector assembly comprising a blade mounted on an automobile body by a pair of mounting brackets. The blade has at least one pair of alignment flanges and a pair of attachment flanges. Each mounting bracket has at least one flange cooperable with one of said blade alignment flanges and a mounting flange cooperable with one of said blade mounting flanges. The fasteners securing the brackets to the vehicle and the blade to the brackets are all obscured from view, providing the wind deflector blade with a smooth contoured outer surface uninterrupted by fasteners or the like while also providing a construction wherein the brackets can be mounted on the vehicle and then the blade mounted to the brackets. A pad may also be set between the bracket and the vehicle surface, which may have further alignment flanges to align said blade in cooperation with additional alignment flanges extending from the blade. The blade attachment flanges may comprise one set of the additional alignment flanges.

8 Claims, 6 Drawing Figures

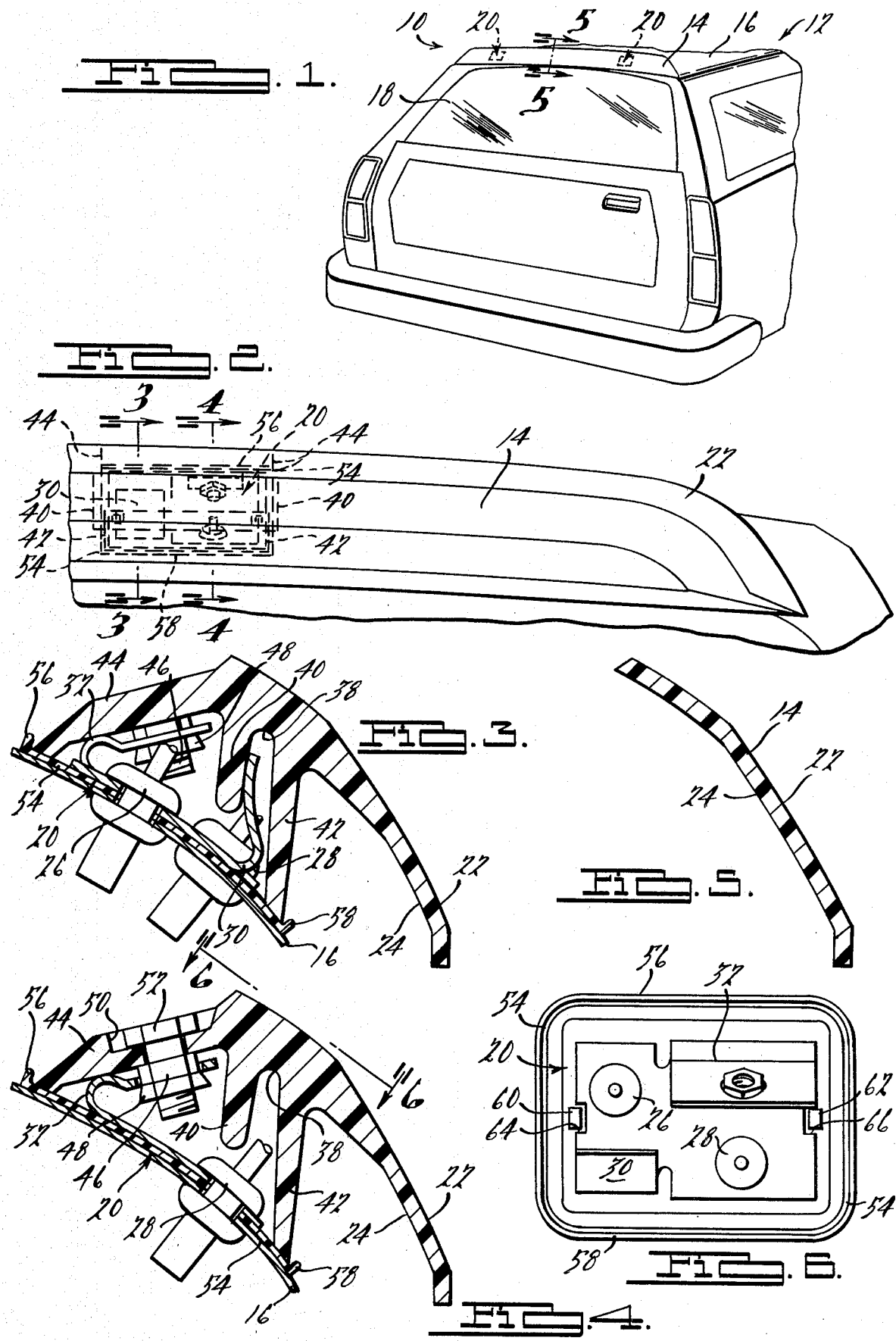

VEHICLE WIND DEFLECTOR

BACKGROUND AND SUMMARY OF THE INVENTION

Automobile wind deflectors have customarily employed an air deflecting blade mounted on the automobile body by a pair of brackets or supports. The connection between the blade and its supports has heretofore involved the use of simple screws passing through holes in the blade and threaded into a tap hole in the support or an arrangement similar to that shown and described in applicant's U.S. Pat. No. 3,799,603, issued Mar. 26, 1974. In the conventional wind deflector, the heads of the screws are accessible from the outer surface of the blade and are clearly visible after assembly of the blade onto the vehicle. From the automobile styling standpoint this method of attachment of the support to the blade has a number of drawbacks. The fastener head interrupts the smooth contour of the outer surface of the blade and presents an undesirable interruption in the blade surface. Furthermore, it is difficult to obtain a fastener which will properly match in color or texture the outer surface of the blade, particularly if the blade is to be painted to match the automobile body color. A screwdriver or other fastener driving tool will damage any paint which is applied to the fastener head. This necessitates touching up the fastener head after the blade is installed on its support, a procedure which automobile dealers and their users find to be highly undesirable.

Although applicant's U.S. Pat. No. 3,799,603 has improved wind deflector blade construction from the standpoint that the outer surface of the assembly is uninterrupted by fasteners or fastener receiving openings, the assembly operation is somewhat time consuming due to the novel interference or friction fit being provided between a support flange and the wall of a slot to prevent movement of the blade longitudinally in a slot, wherein said slots were on the inner surface of the wind deflector blade. Also, the blade in most instances must be mounted to the supports prior to mounting the supports to the vehicle and can be a difficult procedure in some instances.

Accordingly, it is an object of the present invention to provide an automobile wind deflector assembly in which the support is on the inner surface of the blade and in which the outer surface of the blade is uninterrupted by fasteners or fastener receiving openings, but also provides ease in construction and ease in alignment to assemble the wind deflector blade onto the car in a proper position, both aesthetically and functionally. It is another object of the invention to have all fasteners obscured from view to provide an aesthetically appealing appearance to the wind deflector blade when mounted on the car. All these advantages are also to be included with the advantage of permitting the deflector blade to be any length and allowing for a great deal of flexibility in design, such as the curvature at the ends and various different cross sections and contours for the wind deflector blade. All the above advantages are also provided with a design lending itself to low cost stampings for mounting brackets and other low cost features.

BRIEF DESCRIPTION OF THE DRAWINGS

FIG. 1 is a perspective view of a fragmentarily illustrated automobile having mounted thereon a wind deflector assembly made in accordance with the present invention;

FIG. 2 is an enlarged rear fragmentary view of the wind deflector assembly of FIG. 1, having the mounting bracket in phantom lines therein;

FIG. 3 is a sectional side view along the line 3—3 of FIG. 2;

FIG. 4 is a sectional side view along the line 4—4 in FIG. 2;

FIG. 5 is a sectional side view along the line 5—5 of FIG. 1; and

FIG. 6 is a top view of the mounting bracket as viewed along line 6—6 of FIG. 4.

DETAILED DESCRIPTION OF THE PREFERRED EMBODIMENTS

Referring now to FIG. 1, a wind deflector assembly 10 is shown mounted on the rear of an automotive vehicle 12. The wind deflector assembly 10 includes a deflector blade 14 mounted on the automobile adjacent the rear of the automobile roof 16 and immediately above the rear window 18. The blade 14 is spaced outwardly from the outer surface of the body 12 by means of a pair of mounting supports or brackets 20. The blade 14 as shown is preferably manufactured from a plastic material, but can be extruded or cast aluminum or other nonferrous material. The blade also may be die formed to give it a slight longitudinal bow or curvature to be compatible with the contours of the vehicle adjacent the mounted blade.

The blade 14 has a sculptured or contoured outer surface 22 and an inner surface 24. Two mounting brackets 20 are attached to the rear of the station wagon 12 above the rear window 18, to which brackets 20 the wind deflector blade 14 is attached. Each of the mounting brackets 20 is fastened by blind bolt fasteners 26, 28 to the roof 16 in two places.

Each bracket 20 comprises a first alignment clip or flange 30 and an attachment flange 32. The alignment clip 30 in the bracket 20 matches up with a guide slot 38 along the inner surface 24 of the wind deflector blade 14, formed by intermediate alignment flange 40 and lower alignment flange 42 both extending from inner surface 24. The attachment flange 32 aligns with an extended attachment flange portion 44 extending from the deflector blade 14, and the wind deflector blade 14 is secured by bolt 46 and nut 48 to the bracket 20 at the attachment flange 32. The attachment flange portion 44 has a countersink or counterbore 50 to obscure the head 52 of the bolt 46 from view when the blade assembly 10 is mounted on the vehicle 12. A pad 54 is included between the mounting bracket 20 and the vehicle 14 to maintain the finish of the vehicle and provide some resilience to the mounting bracket 20 and vehicle 14 interface. The pad has two alignment flanges 56 and 58. The wind deflector blade 14 is further aligned with the pad flanges by having the attachment flange portion 44 set adjacent the upper pad alignment flange 56 and blade flange 42 set adjacent to the lower pad alignment flange 36.

The mounting bracket 20 is a stamped metal part. The construction of the present invention permits the mounting bracket 20 to be first attached to the vehicle 12 on the mounting pad 54, by blind bolts 26, 28, and then the wind deflector blade 14 can be attached to the mounting bracket 20 by bolts 46 and nuts 48. The mounting bracket 20 is aligned on the pad 54 between two alignment bosses 60 and 62 which are set into two notches 64 and 66, respectively, in the bracket 20 (FIG. 6).

As shown in FIG. 2, the flanges 40, 42 and the attachment flange portion 44 of the wind deflector blade 14 do not extend the length of the blade but only extend for approximately the length of the bracket 20. In the preferred embodiment the attachment flange portion 44 of the deflector blade 14 is both a mounting flange and an alignment bracket, but may also be constructed as separate projections and still be within the scope of the invention. Also, it must be noted that the attachment flange portion 44 along with alignment flanges 40 and 42 may be constructed in certain applications as a part separate from the blade 22 and fixedly secured to the blade 22 in the assembly of the deflector 10 and still be within the scope of the present invention.

With this design, the attachment bolts 46 and the two mounting brackets 20 are obscured from view. The advantages of this arrangement are that it permits the deflector to be any length with a smooth contoured outer surface and allows for a great deal of flexibility in design, such as various types of curvature at the ends and various different cross sections for the wind deflector blade. Also, by allowing the mounts 20 to be stampings, the design lends itself to lower costs since no casting would be required as in a conventional mounting bracket.

It will thus be apparent that the present invention is unimpaired by fasteners and may be painted, covered with a decal, buffed or finished in any desired manner without any undesired consequences resulting from the fastening of the blade to its supports. And while it will be apparent that the preferred embodiment of the invention disclosed is well calculated to fulfill the objects above stated, it will be appreciated that the invention is susceptible to modification, variation and change without departing from the proper scope or fair meaning of the subjoined claims.

What is claimed is:

1. An automobile wind deflector assembly for attachment to an automotive vehicle comprising
    a wind deflector blade, having at least one pair of alignment flanges and a pair of attachment flanges;
    a pair of mounting brackets operable to mount the blade on an automobile body, each having at least one flange cooperable with one of said alignment flanges of said blade and a mounting flange cooperable with one of said wind deflector mounting flanges;
    means for fastening said mounting brackets to said automotive vehicle; and
    means for securing said blade to said mounting brackets comprising means for fastening each of said blade mounting flanges to one of said bracket mounting flanges,
    wherein said mounting flanges of said wind deflector blade includes means for obscuring both said means for securing said blade to each said mounting bracket and both of said mounting brackets from view when said wind deflector assembly is fully assembled on said vehicle.

2. A claim in accordance with claim 1, wherein each said attachment flange of said blade is also an alignment flange.

3. A claim in accordance with claim 2, wherein said blade has three alignment flanges comprising a first lower alignment flange, a second intermediate alignment flange, and said attachment flange.

4. A claim in accordance with claim 3, further comprising means associated with said mounting bracket for aligning said top flange and lower flange of said blade, said aligning means having a top flange cooperable with said blade attachment flange, and having a lower flange cooperable with said lower blade flange.

5. A claim in accordance with claim 4, wherein said means for aligning comprises a pad set between said mounting bracket and the associated surface of said vehicle.

6. A claim in accordance with claim 5, wherein said pad further comprises two alignment bosses and said mounting bracket further comprises two notches whereby said mounting bracket is aligned on said pad by aligning said bosses with said notches.

7. A claim in accordance with claim 1, wherein said means for fastening said mounting brackets to said automotive vehicle includes blind bolt fasteners.

8. A claim in accordance with claim 1, wherein each said mounting bracket is formed by a stamping process.

* * * * *